(12) United States Patent
Waldinger et al.

(10) Patent No.: US 10,800,025 B2
(45) Date of Patent: Oct. 13, 2020

(54) MONOBLOC TOOL FOR THE PRODUCTION OF MOLDED PARTS

(71) Applicant: Lisa Draexlmaier GmbH, Vilsbiburg (DE)

(72) Inventors: Tobias Waldinger, Neumarkt—St. Veit (DE); Christian Weiss, Tuessling (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 390 days.

(21) Appl. No.: 15/655,334

(22) Filed: Jul. 20, 2017

(65) Prior Publication Data

US 2018/0021936 A1   Jan. 25, 2018

(30) Foreign Application Priority Data

Jul. 21, 2016   (DE) .......................... 10 2016 113 507

(51) Int. Cl.
*B25G 1/04* (2006.01)
*B29C 63/00* (2006.01)
(Continued)

(52) U.S. Cl.
CPC .............. *B25G 1/043* (2013.01); *B25G 1/085* (2013.01); *B25G 1/105* (2013.01); *B29C 63/0065* (2013.01); *B32B 37/065* (2013.01); *B32B 37/142* (2013.01); *B33Y 80/00* (2014.12); *B22F 3/1055* (2013.01); *B29C 33/04* (2013.01); *B29C 33/126* (2013.01); *B29C 33/306* (2013.01); *B29C 45/7312* (2013.01); *B29C 2049/483* (2013.01); *B29C 2049/4825* (2013.01); *B29C 2049/4828* (2013.01);
(Continued)

(58) Field of Classification Search
CPC ........ B29C 45/7312; B29C 2049/4825; B29C 2049/4828; B29C 2049/483; B29C 2049/4861; B29C 63/0065; B29C 33/126; B29C 33/306; B29C 33/04; B25G 1/043; B25G 1/085; B25G 1/105; B33Y 80/00; B33Y 10/00; B32B 37/065; B32B 37/142; Y02P 10/295; B22F 3/1055; B29L 2031/3008
USPC .............................. 249/79; 425/526, 552, 47
See application file for complete search history.

(56) References Cited

U.S. PATENT DOCUMENTS

2007/0283786 A1* 12/2007 Kappmeyer .......... B22F 3/1055
                                                                76/101.1
2013/0147092 A1*  6/2013 Jenko ..................... B29C 45/20
                                                                264/328.15

FOREIGN PATENT DOCUMENTS

DE   19937260   2/2001
DE   19937315   2/2001
DE   10065594   5/2002

OTHER PUBLICATIONS

"Reducing Porosity in AlSi10Mg Parts Processed by Selective Laser Melting", Aboulkhair et al., Additive Manufacturing vol. 1-4, Oct. 2014, pp. 77-86. (Year: 2014).*

* cited by examiner

*Primary Examiner* — Joseph S Del Sole
*Assistant Examiner* — Lawrence D. Hohenbrink, Jr.
(74) *Attorney, Agent, or Firm* — Burris Law, PLLC

(57) ABSTRACT

The present disclosure relates to a monobloc tool for the production of laminated molded parts. The tool includes an effective surface area facing the molded part to be laminated, a usable surface area facing a tool holder for securing the tool 1, at least one fluid duct 4 passing through without kinks (Continued)

and arranged in the interior near the face of the effective surface area, and at least one cavity arranged between the fluid duct and the usable surface area.

18 Claims, 1 Drawing Sheet

(51) Int. Cl.
*B33Y 80/00* (2015.01)
*B25G 1/08* (2006.01)
*B25G 1/10* (2006.01)
*B32B 37/06* (2006.01)
*B32B 37/14* (2006.01)
*B33Y 10/00* (2015.01)
*B29L 31/30* (2006.01)
*B22F 3/105* (2006.01)
*B29C 45/73* (2006.01)
*B29C 49/48* (2006.01)
*B29C 33/04* (2006.01)
*B29C 33/12* (2006.01)
*B29C 33/30* (2006.01)

(52) U.S. Cl.
CPC ................. *B29C 2049/4861* (2013.01); *B29L 2031/3008* (2013.01); *B33Y 10/00* (2014.12); *Y02P 10/295* (2015.11)

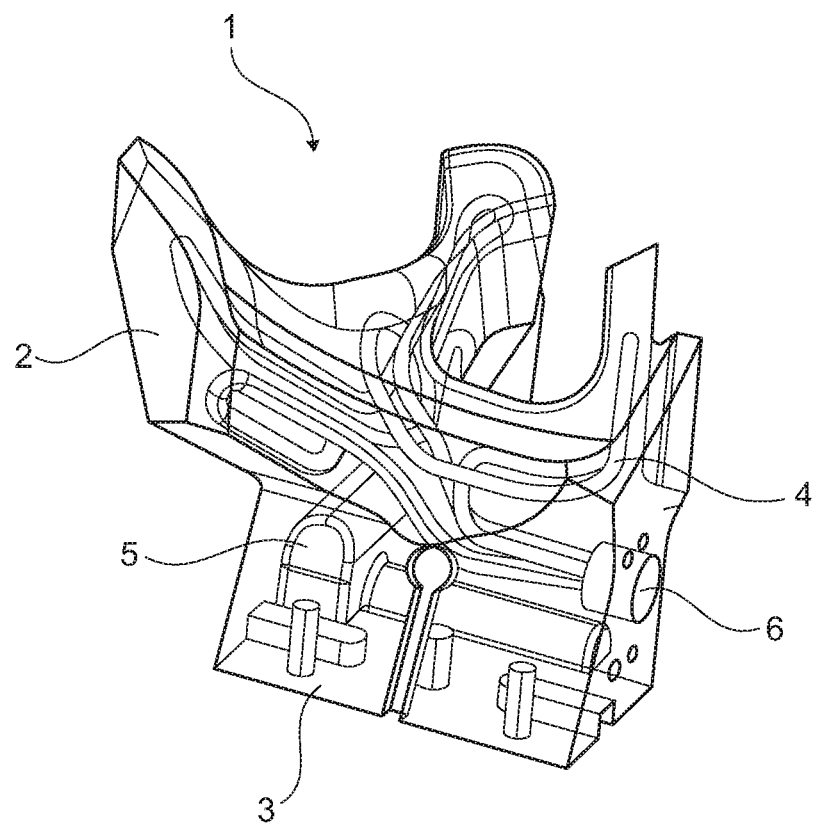

ized. Large areas to be laminated are generally controlled with one temperature control unit. This can result in local overheating or dropping below the required contact temperature of the adhesive. In automotive engineering, application of high temperatures can be particularly damaging to decor materials when interior components are being bonded together.

MONOBLOC TOOL FOR THE PRODUCTION OF MOLDED PARTS

CROSS-REFERENCE TO RELATED APPLICATIONS

This application claims priority to and the benefit of German Patent Application No. DE 10 2016 113 507.0 filed on Jul. 21, 2016. The disclosure of the above application is incorporated herein by reference.

FIELD

The present disclosure relates to a monobloc tool for the production of laminated molded parts and to a method of producing a one-part workpiece.

BACKGROUND

The statements in this section merely provide background information related to the present disclosure and may not constitute prior art.

The method of press lamination of interior components such as an instrument panel is a common method in which heated molding tools (milled metal block) are used to (re)activate a layer of adhesive by means of the laminating parameters of pressure, temperature and time, and the adhesive layer then forms a bond between the carrier material and the decor to be applied. In most laminating tools the molding tool, i.e. the lower and the upper dies, are heated with fluid media to a specified temperature at which the adhesive is activated. This step is decisive for good adhesion and for the overall bonding of the component. The activation process is critical and extremely complex in terms of energy, since a large amount of energy must be expended within an extremely short time to activate the adhesive that has been applied and possibly dried (such as an aqueous dispersion adhesive or hotmelt) and then to convert it to the liquid phase that is necessary to moisten the surface and ensure adhesion at the surface edges. It does not matter which side the adhesive is applied to. The adhesive can be applied to the carrier or to the decor layer or to a composite decor material.

The joining members (carrier and decor) are pre-fixed and inserted into a conventional press lamination tool. After the two mold halves, i.e. the lower and the upper dies, have been brought to the proper temperature and closed, pressure is applied to transfer a temperature from the tool surface to the component surface (decor and carrier) and from there into the adhesive joint of the component. This leads to an activation or linkage of the adhesive. Depending on the structure of the decor and carrier, the conveyance of heat into the adhesive joint is severely impeded due to a thermal insulating property of the materials. Process times of 240 seconds and longer are the result. To keep the cycle times down to an acceptable level, the component could be removed while still warm. However, decors with a high degree of recoiling forces could undergo delamination (detachment) in this way. The only solution in this case would be to subsequently cool the parts in the tool. Ideally, the component is cooled while still under pressure in the closed press lamination tool.

At present, directly heating and cooling in a tool is only possible if powerful temperature control units are used, which, however, require long cycle times with high energy consumption to regulate the temperature to high or low levels. Large areas to be laminated are generally controlled with one temperature control unit. This can result in local overheating or dropping below the required contact temperature of the adhesive. In automotive engineering, application of high temperatures can be particularly damaging to decor materials when interior components are being bonded together.

Commonly used hotmelt adhesives are free of solvents and are more or less solid at room temperature, transitioning to a liquid state when heated and creating the relevant bond upon cooling.

However, it must be considered that when hotmelt adhesives are used instead of dispersion adhesives, the hotmelt adhesive has to be cured under controlled conditions. This means that parts adhered by press lamination should not be moved until the hotmelt adhesive has cooled sufficiently, typically having reached a temperature less than or equal to 40° C. Only then should the parts be removed from the tool. The duration of a curing process of a hotmelt adhesive is significantly shorter than that of a dispersion adhesive for the adhesive to achieve the same consistency.

It is basically known in DE 100 65 594 C2 to sinter cooling ducts into components, particularly injection molding tools, thereby eliminating the need for bores and the like on the finished component blank.

DE 199 37 315 A1 teaches a method of determining and producing temperature-control ducts in thermally stressed molds, in which criteria for the temperature-control ducts are determined through thermo-analysis in a first phase, and in a second phase the criteria are implemented via CNC data. In a third phase application of the material is controlled through the CNC data on producing the mold.

The method described in DE 199 37 260 A1 for the production of a three-dimensional object teaches that after the phase of powder application and solidification the unsolidified material should be removed in a controlled fashion such as by means of a liquid medium or a brush.

SUMMARY

The present disclosure provides a monobloc tool for the production of laminated molded parts in such a manner that it is easy to manufacture and capable of being homogenously cooled or heated by a medium flowing through it.

In one form, this is achieved by a monobloc tool having the features of claim 1 and by a method of production of such a monobloc tool having the features of claim 14.

According to the present disclosure, the monobloc tool has an effective surface area and a usable surface area. The effective surface area faces the molded part to be laminated and the usable surface area faces a tool holder for attachment of a component. At least one fluid duct passing through with no kinks is arranged in the interior near the face of the effective surface area. The tool also includes at least one cavity arranged between the fluid duct and the usable surface area.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective transparent view of a tool according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a tool 1 includes an effective surface area 2. The effective surface area 2 faces a molded part (not shown) to be laminated. The tool 1 also includes a usable surface area 3. The usable surface area 3 faces a tool holder (not shown) for attachment of the tool 1. The tool 1 includes at least one fluid duct 4 in its interior. The fluid duct 4 is arranged as close as possible to the face of the effective surface area 2.

The distance of the fluid duct 4 from the effective surface area 2 can be kept virtually constant across the entire course of the fluid duct along the effective surface area 2.

The tool 1, which in this form is for an insert for an instrument panel that is integrated in an upper tool die (not shown), is produced with the aid of selective laser melting. In one form, the laser melting is a LaserCUSING® brand selective laser melting process by CONCEPT Laser GmbH, which uses standard commercial batch materials in powder form that are locally fused by a high-energy fiber laser.

In the generative (or "additive") manufacturing technique of the LaserCUSING® brand selective laser melting process, serial production materials containing no binder are used in powder form. Examples of materials include stainless steel, tool steel, cobalt-chromium alloys, nickel-based alloys and ceramics, as well as reactive powder materials such as aluminum and titanium alloys. With the method of the present disclosure, a thin layer of powder is first applied to a baseplate. The thickness of the layer of powder ranges between 20 µm and 100 µm. A high-power fiber laser completely melts the single-component powder in the areas of the planned workpiece in accordance with computer-generated construction data. After cooling, the powder then forms a solid layer of material. This base plate is then lowered by the dimension of the layer thickness, and a new layer of powder is applied and again melted by the laser in the specified areas. At the end of the production process the unmelted powder is removed and can be reused.

Producing the insert using the LaserCUSING® brand selective laser melting process makes conformal temperature control possible. When fluid ducts are produced using conventional methods, for instance by milling or drilling, it is not possible to distribute the fluid ducts evenly at identical distances from the effective surface area. Furthermore, it is not possible in conventional production to provide fluid ducts in recesses and/or corner areas.

In one form, the material used for the tool 1 is an aluminum alloy CL 31AL ($AlSi_{10}Mg$), as it has physical properties similar those of the material (AlMg4,5Mn0,7) already being used for the press laminating tools.

According to the present disclosure, the tool 1 has a cavity. The cavity is arranged between the fluid duct 4 and the usable surface area 3. Small supporting ribs may be added to enhance the stability of the vacant space. With the addition of the vacant space, material and manufacturing costs can be lowered due to a shorter production time of the laminar structure. Moreover, the cavity can inhibit the transfer of heat to the usable surface area, which should not be temperature controlled. The cavity is spaced apart from the fluid duct 4, the usable surface area 3 and/or side limits of the tool 1, and in one form with a minimum spacing of 2 mm, and in another form 3 mm, and yet in another form with a maximum spacing of 10 mm, and in one form 8 mm. Accordingly, it is possible to attach the insert (tool) or to affix components to the tool 1 in the space between the cavity and the usable surface area 3 and/or the side limits.

In manufacturing components from CL 31Al using the LaserCusing® brand selective laser melting process, the attainable surface quality amounts to $R_z$=30-50 µm. Problems may arise since the insert for the instrument panel is relatively large, for instance 145 mm×140 mm×155 mm, for being produced by selective laser melting. These problems may be alleviated by constructing the body on a base plate. An added height measure per layer of selective laser melting of about 2 mm is preferable. A surface quality of 1.5 µm to 5 µm, in one form 2.5 µm, and a contour precision of 0.1 mm, in one form 0.05 mm and in another form 0.03 mm can be achieved.

To relieve additional inner stresses, a stress-relief tempering process may be applied directly following the manufacturing process using the LaserCusing® brand selective laser melting process. Without this production step, possible stresses could relax and could lead to geometrical deviations due to warping.

According to one form, an inlet port and an outlet port of the fluid duct 4 are located on opposite side faces of the tool 1. The structure of the one or more fluid ducts can optionally be adapted to the geometry of the tool 1, to permit improved temperature control. For example, four ducts may be provided in the tool to homogenously control the temperature of the effective surface area 2. The individual fluid ducts may also have different diameters. As an example, two fluid ducts have a diameter of d=4.5 mm and two have a diameter of d=5.5 mm. The selection of the diameters makes it possible to achieve a homogenous temperature control even in small sections of the tool.

The path of the one or more fluid ducts may vary in the tool 1. The fluid duct may preferably be guided directly downstream of the inlet port in a direction approximately perpendicular to the effective surface area, then parallel to the effective surface area and finally approximately perpendicular to the effective surface area 2 as it is guided to the outlet port. This makes it possible for as much of the effective surface area 2 as possible to be either cooled or heated through the fluid duct 4. Several fluid ducts may be arranged parallel to one another to permit an even more homogenous temperature control. In this case, every fluid duct has an inlet port and outlet port or one common inlet port and one common outlet port or one inlet port each and one common outlet port, or one common inlet port and one outlet port each. The diameter of the inlet port and of the outlook port in one form is at least 10 mm and in another form is 12.7 mm. This magnitude corresponds to a standard diameter for connections. Thus, a fluid may be introduced into the fluid duct 4 and conveyed out again through standard lines at low cost and with no additional effort. It follows that the fluid duct must also have a diameter of 10 mm or 12.7 mm at its inlet and at its outlet, with the diameter downstream of the inlet and upstream of the outlet tapering continuously to the desired measure.

Thus, in a tool manufactured using a LaserCusing® brand selective laser melting process, it is possible to achieve a homogenous, fast and precise temperature control through the arrangement of the fluid ducts. In addition, complex structures of the fluid ducts may also be produced in the tool as compared to conventional manufacturing processes.

Specifically in a press laminating tool for an instrument panel of a vehicle, the fluid ducts, particularly the temperature-control ducts, are integrated at a constant, uniform distance from the effective surface area. It is now also possible to implement them in small areas where this was not previously possible. In addition, the heating time required for the tool to reach a desired temperature is substantially shorter than that of a conventionally manufactured tool. In this way, the cycle time of a press laminating process can be reduced.

Also according to the present disclosure, a method of production of a tool is provided for the manufacture of laminated molded parts. The monobloc tool is produced by selective laser melting in which single-component or multi-component metallic powder is melted in a layering process using a focused laser beam, and one or more fluid ducts and one or more cavities are formed in the interior of the tool.

To achieve as homogenous and rapid a temperature control of the effective surface area 2 as possible, the fluid duct 4 is free of kinks and penetrates the entire area of the effective surface area 2. To additionally achieve as rapid a temperature control of the effective surface area 2 as possible, several fluid ducts 4 are provided in one form and run parallel if possible. A fluid with a suitable temperature flows through the fluid ducts 4, depending on whether the tool 1 is to be heated or cooled. The fluid is introduced into the fluid ducts 4 through at least one inlet port 6 and discharged from the tool through an outlet port (not shown). These ports supply the parallel fluid ducts 4.

To inhibit heat from being transferred to the usable surface area 3 or to the bordering components, at least one cavity 5 is arranged between the fluid duct 4 and the usable surface area 3. The cavity performs the function of material reduction in addition to thermal insulation. The cavity 5 is spaced from the fluid duct 4, the usable surface area 3 and/or the side faces by a minimum distance of 3 mm and a maximum distance of 8 mm.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A monobloc tool for the production of laminated molded parts comprising:
    a shaping surface area of a press laminating tool facing a molded part to be laminated and a usable surface area facing a tool holder for securing the monobloc tool;
    at least one fluid duct arranged in an interior of the monobloc tool near a surface at the shaping surface area and passing through without kinks;
    at least one cavity arranged between the fluid duct and the usable surface area; and
    an inlet port and an outlet port of the fluid duct arranged on opposite side faces of the monobloc tool.

2. The monobloc tool according to claim 1, wherein a distance of the fluid duct to the shaping surface area is constant over an entire course of the fluid duct along the shaping surface area.

3. The monobloc tool according to claim 1, wherein the monobloc tool is an AlSi10Mg material.

4. The monobloc tool according to claim 3, wherein the monobloc tool is produced using selective laser melting.

5. The monobloc tool according to claim 1, wherein the at least one cavity is spaced from the at least one fluid duct, the usable surface area, and side limits of the monobloc tool by a minimum distance of 3 mm.

6. The monobloc tool according to claim 1, wherein the cavity is spaced from the at least one fluid duct, the usable surface area, and side limits of the monobloc tool by a maximum distance of 10 mm.

7. The monobloc tool according to claim 4, wherein the monobloc tool has a surface quality of 1.5 µm to 5 µm Rz.

8. The monobloc tool according to claim 7, wherein the surface quality is 2.5 µm Rz.

9. The monobloc tool according to claim 4, wherein the monobloc tool has a contour precision of 0.1 mm.

10. The monobloc tool according to claim 4, wherein the monobloc tool has a contour precision of 0.05 mm.

11. The monobloc tool according to claim 4, wherein the monobloc tool has a contour precision of 0.03 mm.

12. The monobloc tool according to claim 1, wherein the fluid duct is guided directly downstream of the inlet port in a direction approximately perpendicular to the shaping surface area, then parallel to the shaping surface area, and finally approximately perpendicular to the shaping surface area as the fluid duct extends to the outlet port.

13. The monobloc tool according to claim 1 further comprising a plurality of fluid ducts are arranged adjacent one another.

14. The monobloc tool according to claim 13, wherein the plurality of fluid ducts have a common inlet port and a common outlet port.

15. The monobloc tool according to claim 13 further comprising a cooling fluid disposed in the plurality of fluid ducts.

16. The monobloc tool according to claim 13, wherein each of the plurality of fluid ducts have different diameters.

17. A method for the production of a monobloc tool according to claim 1 by selective laser melting, wherein in a layering process a single-component or multi-component metallic powder is melted using a focused laser beam and the at least one fluid duct and the at least one cavity are formed in the interior of the monobloc tool.

18. A monobloc tool manufactured according to the method of claim 17.

* * * * *